US006934383B2

(12) United States Patent
Kim

(10) Patent No.: US 6,934,383 B2
(45) Date of Patent: Aug. 23, 2005

(54) APPARATUS FOR REDUCING ECHOES AND NOISES IN TELEPHONE

(75) Inventor: Jung-Sik Kim, Seoul (KR)

(73) Assignee: Samsung Electronics Co., Ltd., Suwon-si (JP)

( * ) Notice: Subject to any disclaimer, the term of this patent is extended or adjusted under 35 U.S.C. 154(b) by 255 days.

(21) Appl. No.: 10/294,706

(22) Filed: Nov. 15, 2002

(65) Prior Publication Data

US 2003/0103623 A1 Jun. 5, 2003

(30) Foreign Application Priority Data

Dec. 4, 2001 (KR) ........................................ 2001-76157

(51) Int. Cl.[7] ................................................ H04M 1/00
(52) U.S. Cl. .................. 379/392; 379/406.01; 379/394
(58) Field of Search ....................... 379/406.01, 390.02, 379/392, 394

(56) References Cited

U.S. PATENT DOCUMENTS 3,668,320 A 6/1972 Duck
4,423,282 A 12/1983 Suzuki et al.
4,433,215 A * 2/1984 Wortman .................... 379/345

FOREIGN PATENT DOCUMENTS

| | | |
|---|---|---|
| DE | 3408145 | 9/1985 |
| EP | 0055650 | 7/1982 |
| EP | 0692921 | 1/1996 |
| JP | 11-329092 | 11/1999 |
| JP | 2000-200657 | 7/2000 |
| WO | WO 1990/000302 | 1/1990 |

OTHER PUBLICATIONS

Bur Goode, "Voice over Internet Protocol (VoIP)," *Proceedings of the IEEE*, vol. 90, No. 9, Sep. 2002, pp. 1495–1517.
"*Combined Search and Examination Report under Section 17 & 18(3)*" dated on Mar. 11, 2003 issued by U.K. Patent Office.

* cited by examiner

*Primary Examiner*—Jefferey F. Harold
(74) *Attorney, Agent, or Firm*—Robert E. Bushnell, Esq.

(57) ABSTRACT

An apparatus for reducing echoes which are generated due to signals induced to a handset connector in a telephone, includes a round-type handset connector cord arranged into a round configuration having a certain arrangement of the speech transmitting and receiving lines, and a connecting unit provided in the body of the telephone and having a differential amplifier for applying signals received to a transmitting unit by differentially amplifying the signals. Alternatively, the apparatus for reducing echoes includes a flat-type handset connector cord having the lines arranged in a certain order, and a connecting unit for connecting the speech transmitting and receiving lines in certain manner. Alternatively, the apparatus for reducing echoes and noises includes a flat-type handset connector cord having the lines arranged in a certain order, and a connecting unit connecting to the speech-transmitting lines and the speech-receiving lines in a certain manner.

24 Claims, 7 Drawing Sheets

APPARATUS FOR REDUCING ECHOES AND NOISES IN TELEPHONE

CLAIM OF PRIORITY

This application makes reference to, incorporates the same herein, and claims all benefits accruing under 35 U.S.C. §119 from my application entitled DEVICE FOR REDUCING ECHO AND NOISE IN PHONE earlier filed with the Korean Industrial Property Office on Dec. 4, 2001 and there duly assigned Serial No. 2001-76157.

BACKGROUND OF THE INVENTION

1. Field of the Invention

The present invention relates to a telephone, and more particularly, to an apparatus for reducing echoes and noises.

2. Description of the Related Art

Generally in a wire or wireless system such as VoIP (Voice Over Internet Protocol) causing delay by a large amount, a transmitted signal evidently has echoes. As the echoes occur like this, when a speaker in a telephone outputs a voice of a far end talker, the voice is heard not only to a near end talker but also to the far end talker obstructing conversation since the voice is inputted via a microphone and then undergoes feedback toward the far end talker through several passages of a communication channel.

In a wire telephone in a Public Switched Telephone Network (PSTN), the created echoes rarely create any delay. On conversation via a handset, the echoes are not clearly heard or discriminated to a user covered with sidetone. Thus, the echoes may not cause any serious problems.

On the contrary, since a VoIP telephone or a mobile telephone may have the delay by a large degree, the quality of conversation is degraded due to the echoes in such a degree that it can be definitely recognized.

Classifying the echoes according to the cause of generation, the echoes include side-tone, induced echo, acoustic echo and the like, in which the side-tone is an echo generated by inputting a portion of a signal on a speech-transmitting again into a speech-receiving channel in the telephone for obtaining natural voice conversation, the induced echo is generated due to induction in a communication line or handset connector cord, and the acoustic echo is generated since a voice from a speaker in a receiving terminal is inputted into a microphone again.

In the above echoes, the sidetone is intentionally generated and thus has no problem. The acoustic echo is reduced by using an echo canceller with a Digital Signal Processor (DSP) in general.

In the telephone, the handset connector cord generally uses a flat-type curl cord having a pair of speech-transmitting lines and a pair of speech-receiving lines arranged in parallel. The cord is long enough to reach 2 or 3 m (meters) when the curl is unwound. Therefore, a signal in the speech-receiving line is induced to the speech-transmitting line by a large amount causing the echo so that the counterpart of the conversation can hear his or her own voice after a certain time period lapses.

The construction of a typical telephone connected to a handset is as follows. A telephone body and a handset are connected by a flat-type handset connector cord, in which only a speech-transmitting unit, a speech-receiving unit and a connecting unit of the telephone body are shown. The connecting unit has a pair of speech-transmitting line terminals Tx+ and Tx− and a pair of speech-receiving line terminals Rx+ and Rx−, in which the speech-transmitting line terminals Tx+ and Tx− are connected to the speech-transmitting unit. On the other hand, one of the speech-receiving line terminal Rx+ is connected to the speech-receiving unit, and the other one of the speech-receiving line terminal Rx− is connected to the ground. The speech-transmitting line terminal Tx+ is applied with a bias voltage Vref via a resistance R1. The handset connector cord joining the connecting unit to connect the handset to the telephone body includes a pair of speech-transmitting lines connecting to a microphone in the handset and a pair of speech-receiving lines connecting to a speaker in the handset. The handset connector cord uses a flat-type curl cord in which the Tx+ speech-transmitting line, the Rx+ speech-receiving line, Rx− speech-receiving line and the Tx− speech-transmitting line are arranged in sequence. Also, a modular jack is generally used to connect between the connecting unit and the handset connector cord.

In the handset connector cord as set forth above, the Rx+ speech-receiving line and the Tx+ speech-transmitting line are arranged side-by-side adjacent to each other so that a signal along the Rx+ speech-receiving line may be induced toward the Tx+ speech-transmitting line due to an induced current to generate the echoes. Further, the speech-receiving side is in the low impedance state and thus hardly influenced by external noises. On the other hand, the speech-transmitting side is in the high impedance state and thus readily influenced by even a small amount of the external noises.

SUMMARY OF THE INVENTION

Accordingly, the present invention has been made to solve the foregoing and other problems and it is an object of the present invention to provide an apparatus capable of reducing echoes which are generated due to signals induced to a handset connector cord in a telephone.

It is another object of the invention to provide an apparatus capable of reducing echoes as well as noises which are generated due to signals induced to a handset connector in a telephone.

It is still another object of the present invention to provide an apparatus capable of reducing echoes or both echoes and noise that are generated due to signals induced to a handset connector in a telecommunication device, and yet is easy and inexpensive to manufacture and implement.

According to an aspect of the invention to obtain the above and other objects, an apparatus is provided for reducing echoes in a telephone, including: a round-type handset connector cord arranged into a round configuration and having Tx+ and Tx− speech-transmitting lines and Rx+ and Rx− speech-receiving lines for connecting a handset to a body of the telephone with the Tx+ and Tx− speech-transmitting lines being connected to a microphone of a handset and the Rx+ and Rx− speech-receiving lines being connected to a speaker of the handset, wherein the Tx+ and Tx− speech-transmitting lines are opposed to each other, and each of the Rx+ and Rx− speech-receiving lines alternates with each of the Tx+ and Tx− speech-transmitting lines; and a connecting unit provided in the body of the telephone and having a differential amplifier for applying signals received via the Tx+ and Tx− speech-transmitting lines to a transmitting unit by differentially amplifying the signals, wherein the connecting unit connects the Tx+ speech-transmitting line to a non-inversion input terminal of the differential amplifier, the Tx− speech-transmitting line to an inversion input terminal of the differential amplifier, the Rx+ speech-receiving line to a speech receiving unit, and the Rx− speech-receiving line to the ground.

According to another aspect of the invention to obtain the above and other objects, an apparatus is provided for reducing echoes in a telephone, including: a flat-type handset connector cord having Tx+ and Tx− speech-transmitting lines and Rx+ and Rx− speech-receiving lines for connecting a handset to a body of the telephone with the Tx+ and Tx− speech-transmitting lines being connected to a microphone of a handset and the Rx+ and Rx− speech-receiving lines being connected to a speaker of the handset, wherein the lines are arranged in the order of the Tx+ speech-transmitting line, the Rx+ speech-receiving line, the Rx− speech-receiving line, the Tx− speech-transmitting line; and a connecting unit provided in the body of the telephone for connecting the Tx+ speech-transmitting line to a speech-transmitting unit, the Rx− speech-receiving line to a speech-receiving unit, the Rx+ speech-receiving line and the Tx− speech-transmitting line to the ground.

According to yet another aspect of the invention to obtain the above and other objects, an apparatus is provided for reducing echoes and noises in a telephone, including: a flat-type handset connector cord having Tx+ and Tx− speech-transmitting lines and Rx+ and Rx− speech-receiving lines for connecting a handset to a body of the telephone with the Tx+ and Tx− speech-transmitting lines being connected to a microphone of a handset and the Rx+ and Rx− speech-receiving lines being connected to a speaker of the handset, wherein the lines are arranged in the order of the Rx+ speech-receiving line, the Rx− speech-receiving line, the Tx+ speech-transmitting line, and the Tx− speech-transmitting line; and a connecting unit provided in the body of the telephone for connecting the Tx+ speech-transmitting line to a speech-transmitting unit, the Rx− speech-receiving line to a speech-receiving unit, the Rx+ speech-receiving line and the Tx− speech-transmitting line to the ground.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
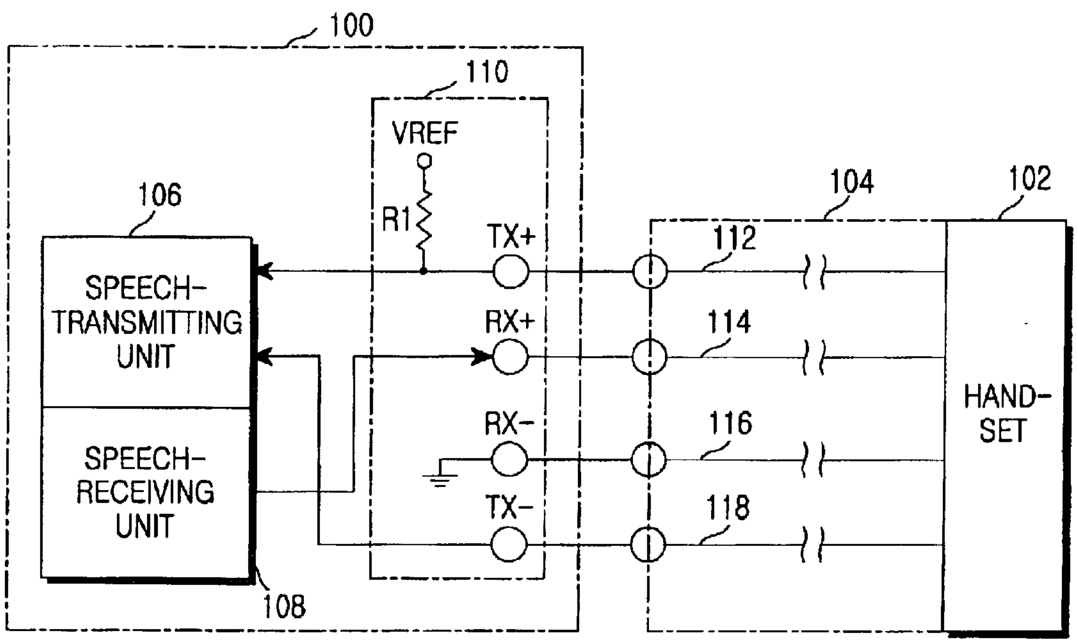
FIG. 1 is a block diagram illustrating the construction of a general telephone connected to a handset.
Figure 2:
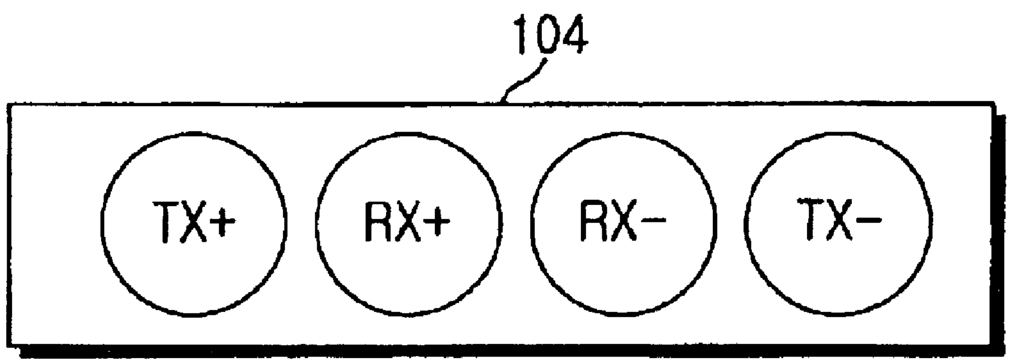
FIG. 2 is a sectional view illustrating a flat-type handset connector cord used in a general telephone.

Turning now to the drawings, FIG. 1 illustrates the construction of a general telephone connected to a handset. FIG. 1 illustrates that a telephone body 100 and a handset 102 are connected by flat-type handset connector cord 104, in which only a speech-transmitting unit 106, a speech-receiving unit 108 and a connecting unit 110 of the telephone body 100 are shown. As shown in FIG. 1, the connecting unit 110 has a pair of speech-transmitting line terminals Tx+ and Tx− and a pair of speech-receiving line terminals Rx+ and Rx−, in which the speech-transmitting line terminals Tx+ and Tx− are connected to the speech-transmitting unit 106. On the other hand, one of the speech-receiving line terminals Rx+ is connected to the speech-receiving unit 108, and the other one of the speech-receiving line terminals Rx− is connected to the ground. The speech-transmitting line terminal Tx+ is applied with a bias voltage Vref via a resistance R1. The handset connector cord 104 joining the connecting unit 110 to connect the handset 102 to the telephone body 100 includes a pair of speech-transmitting lines 112 and 118 connecting to a microphone (not shown) in the handset 102 and a pair of speech-receiving lines 114 and 116 connecting to a speaker (not shown) in the handset 102. The handset connector cord 104 uses a flat-type curl cord in which the Tx+ speech-transmitting line 112, the Rx+ speech-receiving line 114, Rx− speech-receiving line 116 and the Tx− speech-transmitting line 118 are arranged in sequence as shown in FIG. 2. Also, a modular jack is generally used to connect between the connecting unit 110 and the handset connector cord 104.

In the handset connector cord 104 as set forth above, the Rx+ speech-receiving line 114 and the Tx+ speech-transmitting line 112 are arranged side-by-side adjacent to each other so that a signal along the Rx+ speech-receiving line 114 may be induced toward the Tx+ speech-transmitting line 112 due to an induced current to generate the echoes. Further, the speech-receiving side is in the low impedance state and thus hardly influenced by external noises. On the other hand, the speech-transmitting side is in the high impedance state and thus readily influenced by even a small amount of the external noises.

The following detailed description will present a preferred embodiment of the invention in reference to the accompanying drawings, in which well-known functions or constructions will not be described in detail since they would unnecessarily obscure the understanding of the invention.

Figure 3:
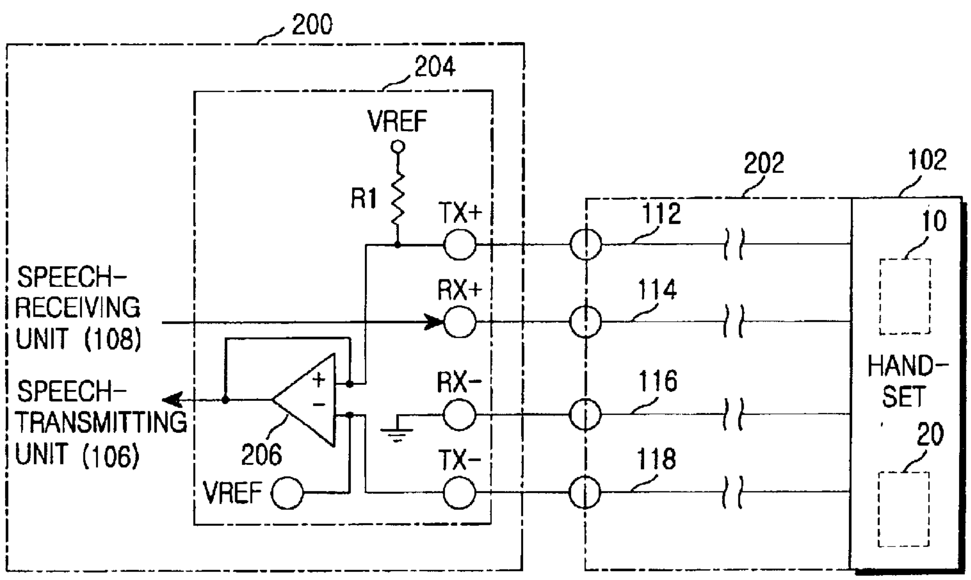
FIG. 3 is a block diagram illustrating the construction of an apparatus for reducing echoes according to a preferred embodiment of the invention.

FIG. 3 is a block diagram illustrating the construction of an apparatus for reducing echoes according to a preferred embodiment of the invention.

Figure 4A:
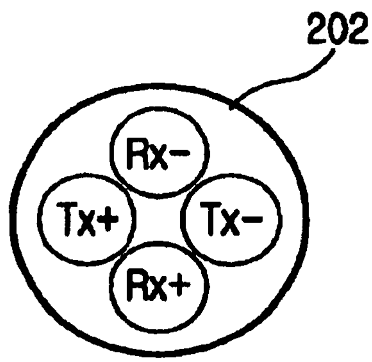
FIGS. 4(*a*) and 4(*b*) are sectional views illustrating a round-type handset connector cord according to the preferred embodiment shown in FIG. 3.
Figure 4B:
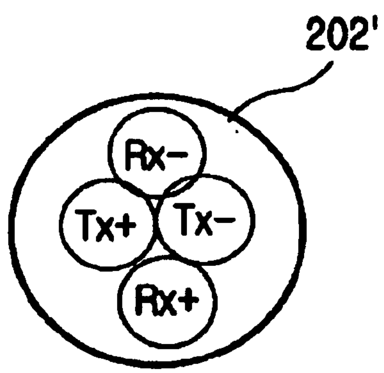

Referring to FIG. 3, a connecting unit 204 having a differential amplifier 206 is used in a telephone body 200 instead of the foregoing connecting unit 110 in the telephone body 100 shown in FIG. 1. A round-type handset connector cord 202 is adopted as shown in FIG. 4(*a*). In the connecting unit 204, speech-receiving line terminals Rx+ and Rx− are respectively connected to a speech-receiving unit 108 and the ground in the same manner as in FIG. 1. On the other hand, the differential amplifier 206 is installed between a speech-transmitting unit 106 and speech-transmitting line terminals Tx+ and Tx−. A Tx+ speech-transmitting line 112 is connected to a non-inversion input terminal (designated with +) of the differential amplifier 206 while a Tx− speech-transmitting line 118 is connected to an inversion input terminal (designated with −) of the differential amplifier 206. Accordingly, the differential amplifier 206 applies signals received via the Tx+ and Tx− speech-transmitting lines 112 and 118 to the speech-transmitting unit 106 by differentially amplifying the signals. In this case, the signals induced from the Rx+ speech-receiving line 114 to the Tx+ and Tx− speech-transmitting lines 112 and 118 are cleared since they are inputted into the differential amplifier 206 with the same phase and magnitude.

When the flat-type handset connector cord 104 as shown in FIG. 2 is used, a signal induced to the Tx+ speech-transmitting line is larger than a signal induced to the Tx− speech-transmitting line since the Rx+ speech-receiving line and the Tx+ speech-transmitting line are adjacent to each other while the Rx− speech-receiving line is arranged between the Rx+ speech-receiving line and the Tx− speech-transmitting line. This rarely has an effect that clears the echoes. Therefore, in order to make the signal induced to the Tx+ speech-transmitting line to have the same magnitude as that induced to the Tx− speech-transmitting line, the round-type handset connector cord 202 is adopted as shown in FIG. 4(*a*). As shown in FIG. 4(*a*), the handset connector cord 202 has the lines which are roundly arranged so that the Tx+ and Tx− speech-transmitting lines 112 and 118 are opposed to each other while the Rx+ and Rx− speech-receiving lines 114 and 116 are alternating with the Tx+ and Tx− speech-transmitting lines 112 and 118, respectively. When seen clockwise in FIG. 4(*a*), the lines are roundly arranged in the order of the Tx+ speech-transmitting line 112, the Rx− speech-receiving line 116, the Tx− speech-transmitting line 118 and the Rx+ speech-receiving line 114.

Using the round-type handset connector cord 202, as shown in FIG. 4(*a*), makes the interval between the Rx+ speech-receiving line 114 and the Tx+ speech-transmitting line 112 be the same as the interval between the Rx+ speech-receiving line 114 and the Tx− speech-transmitting line 118 so that the signals induced by the Tx+ and Tx− speech-transmitting lines 112 and 118 have the same magnitude. Therefore, the signals induced to the Tx+ and Tx− transmitting-lines 112 and 118 by the differential amplifier 206 are so offset to clear almost all of the echoes.

In the meantime, in the actual manufacture of the round-type handset connector cord 202 as shown in FIG. 4(*a*), the round-type handset connector cord may be readily disarranged as shown in FIG. 4(*b*) even though the degree of the disarrangement is different. As seen in FIG. 4(*b*), for example, the interval between adjacent lines such as the interval between the Rx+ speech-receiving line 114 and the Tx+ speech-transmitting line 112 might not be the same as the interval between the Rx+ speech-receiving line 114 and the Tx− speech-transmitting line 118 in the disarranged round-type handset connector cord 202'. When the round-type handset connector cord is disarranged as shown in FIG. 4(*b*), the effect of reducing the echoes will be decreased.

Figure 5:
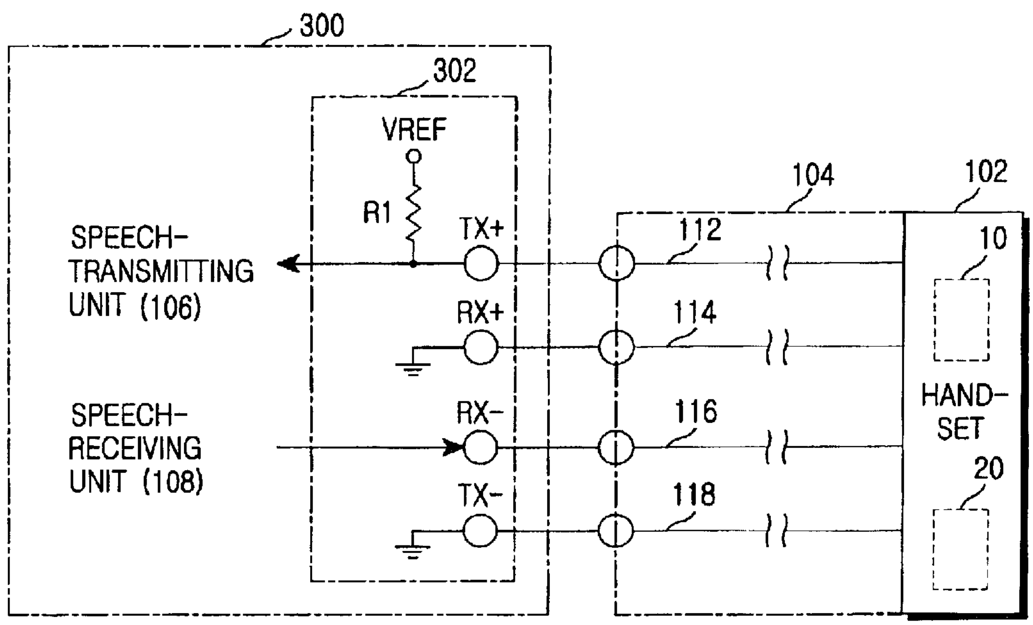
FIG. 5 is a block diagram illustrating the construction of an apparatus for reducing echoes according to an alternative embodiment of the invention.

FIG. 5 is a block diagram illustrating the construction of an apparatus for reducing echoes according to an alternative embodiment of the invention in regard to the above description in order to reduce the echoes with the conventional flat-type handset connector cord 104 shown in FIG. 2. The echo-reducing apparatus in FIG. 5 is constituted by adopting a connecting unit 302 in a telephone body 300 instead of the foregoing connecting unit 110 in the telephone body 100 shown in FIG. 1. In the telephone body 300, a speech-receiving line terminal Rx− is connected to a speech-receiving unit 108 unlike the conventional speech-receiving line terminal Rx− connected to the ground in FIG. 1, and a speech-transmitting line terminal Tx− is connected to the ground unlike the conventional speech-transmitting line terminal Tx− connected directly to the speech transmitting unit 106 in FIG. 1. A speech-transmitting line terminal Tx+ is connected to a speech-transmitting unit 106 in the same manner as in FIG. 1. Therefore, a Tx+ speech-transmitting line 112 is connected to a speech-transmitting unit 106, an Rx− speech-receiving line 116 is connected to the speech-receiving unit 108, and an Rx+ speech-receiving line 114 and a Tx− speech-transmitting line 118 are connected to the ground. Although the Rx+ speech-receiving line 114 is connected to the ground and the Rx− speech-receiving line 116 is connected to the speech-receiving unit 108 unlike the above construction shown in FIG. 1, a speaker 10 in the handset 102 will normally operate as usual since the speaker 10 can operate regardless of the signal Rx+ or Rx− inputted therein. Further, although the Tx− speech-transmitting line 118 is connected to the ground instead of the speech-transmitting unit 106, the Tx+ speech-transmitting line 112 is connected to a microphone 20 in the handset 102 so that the microphone 20 may normally operate as usual.

As set forth above, as the Tx− speech-transmitting line 118 is connected to the ground, a signal induced to the Tx− speech-transmitting line 118 from the Rx− speech-receiving line 116 is grounded. As the Tx+ speech-transmitting line 112 is adjacent to the Rx+ speech-receiving line 114 connected to the ground, a signal from the Rx− speech-transmitting line 116 is not induced to the Tx+ speech-transmitting line 112. This prevents the feedback of a signal from the speech-receiving unit 108 to the speech-transmitting unit 106 thereby reducing the echoes by a large amount.

In the meantime, in consideration that the speech-receiving side is in the low impedance state and thus will be hardly influenced by external noises while the speech-transmitting side is in the high impedance state and thus will be readily influenced by even a small amount of the external noises, it is preferred to reduce noises as well as the echoes.

Figure 6:
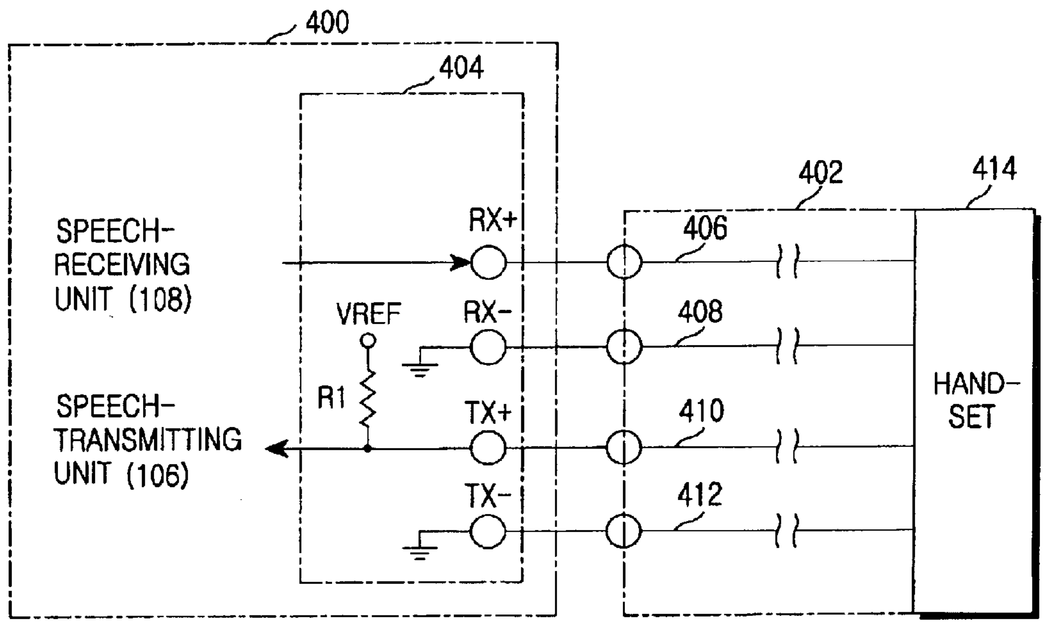
FIG. 6 is a block diagram illustrating the construction of an apparatus for reducing echoes and noises according to the invention.
Figure 7:
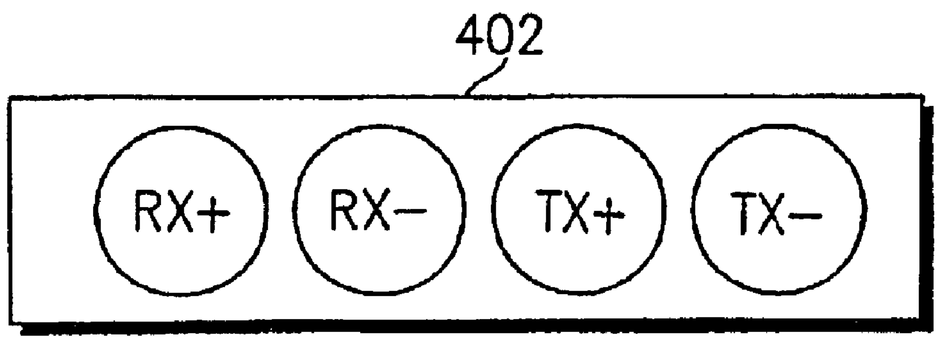
FIG. 7 is a sectional view illustrating a flat-type handset connector cord according to the preferred embodiment shown in FIG. 6.

FIG. 6 is a block diagram illustrating the construction of an apparatus for reducing echoes and noises according to the invention, in which a flat-type handset connector cord 402 is used instead of the conventional handset connector cord 104 shown in FIG. 1. Referring to FIGS. 6 and 7, the flat-type handset connector cord 402 has lines arranged in the order of an Rx+ speech-receiving line 406, an Rx− speech-receiving line 408, a Tx+ speech-transmitting line 410 and a Tx− speech-transmitting line 412. In the echo and noise-reducing apparatus of the invention, a telephone body 400 has a connecting unit 404 so constituted to correspond to the construction of the flat-type handset connector cord 402. In the connecting unit 404, a speech-transmitting line terminal Tx+ is connected to the speech-transmitting unit 106, a speech-receiving line terminal Rx+ is connected to the speech-receiving unit 108, and speech-transmitting line terminal Tx− and a speech-receiving line terminal Rx− are connected to the ground. Accordingly, a Tx+ speech-transmitting line 410 is connected to the speech-transmitting unit 106, the Rx+ speech-receiving line 406 is connected to the speech-receiving unit 108, and the Tx− speech-transmitting line 412 and the Rx− speech-receiving line 408 are connected to the ground.

The connecting unit 404 and the handset connector cord 402 as set forth above do not correspond to the arrangement of terminals of the microphone and speaker in the conventional handset 102 as shown in FIG. 1. So it is necessary to adopt an exclusive-purpose handset 414 having a terminal arrangement corresponding to that of the connecting unit 404 and the handset connector cord 402 of the invention. In using the exclusive handset 414, the Tx+ speech-transmitting line 410 is placed between the Rx− speech-receiving line 408 and the Tx− speech-transmitting line 412 resultantly preventing a signal from being induced from the Rx+ speech-receiving line 406 to the Tx+ speech-transmitting line 410. This accordingly prevents the signal from the speech-receiving unit 108 that may return to the speech-transmitting unit 106 due to the feedback thereby reducing the echo by a large amount while reducing the noises flowing to the speech-transmitting unit 106 by a large amount.

As set forth above, the present invention have the following advantages. The same magnitude of signals are induced to the Tx+ and Tx− transmitting lines from the speech-receiving lines and the echoes are cleared through the differential amplification so as to reduce the echoes due to the signals induced between the lines of the handset connector cord. Further, the line arrangement of the handset connector cord is modified from that of the conventional handset connector cord so as to reduce the echoes due to the signals induced between the handset connector cord lines and the noises also.

Although the preferred embodiments of the present invention have been disclosed for illustrative purposes, those skilled in the art will appreciate that various modifications, additions and substitutions can be made without departing from the scope and spirit of the invention as disclosed in the accompanying claims.

What is claimed is:

1. An apparatus for reducing echoes in a telephone, comprising:

a round-type handset connector cord arranged into a round configuration and including Tx+ and Tx− speech-transmitting lines and Rx+ and Rx− speech-receiving lines for connecting a handset to a body of the telephone with the Tx+ and Tx− speech-transmitting lines being connected to a microphone of a handset and the Rx+ and Rx− speech-receiving lines being connected to a speaker of the handset, the Tx+ and Tx− speech-transmitting lines being opposed to each other, and each of the Rx+ and Rx− speech-receiving lines alternating with each of the Tx+ and Tx− speech-transmitting lines; and a connecting unit provided in the body of the telephone and including a differential amplifier applying signals received via the Tx+ and Tx− speech-transmitting lines to a transmitting unit by differentially amplifying the signals, the connecting unit connecting the Tx+ speech-transmitting line to a non-inversion input terminal of the differential amplifier, the Tx− speech-transmitting line to an inversion input terminal of the differential amplifier, the Rx+ speech-receiving line to a speech receiving unit, and the Rx− speech-receiving line to the ground.

2. The apparatus for reducing echoes according to claim 1, the handset connector cord being arranged in the round configuration in the order of the Tx+ speech-transmitting line, the Rx− speech-receiving line, the Tx− speech-transmitting line and the Rx+ speech-receiving line.

3. The apparatus for reducing echoes according to claim 1, the handset connector cord being a curl cord.

4. An apparatus for reducing echoes in a telephone, comprising:

a flat-type handset connector cord including Tx+ and Tx− speech-transmitting lines and Rx+ and Rx− speech-receiving lines for connecting a handset to a body of the telephone with the Tx+ and Tx− speech-transmitting lines being connected to a microphone of a handset and the Rx+ and Rx− speech-receiving lines being connected to a speaker of the handset, the lines being arranged in the order of the Tx+ speech-transmitting line, the Rx+ speech-receiving line, the Rx− speech-receiving line, the Tx− speech-transmitting line; and a connecting unit provided in the body of the telephone for connecting the Tx+ speech-transmitting line to a speech-transmitting unit, the Rx− speech-receiving line to a speech-receiving unit, the Rx+ speech-receiving line and the Tx− speech-transmitting line to the ground.

5. The apparatus for reducing echoes according to claim 4, the handset connector cord being a curl cord.

6. An apparatus for reducing echoes and noises in a telephone, comprising:

a flat-type handset connector cord including Tx+ and Tx− speech-transmitting lines and Rx+ and Rx− speech-receiving lines connecting a handset to a body of the telephone, the lines being arranged in the order of the Rx+ speech-receiving line, the Rx− speech-receiving line, the Tx+ speech-transmitting line, and the Tx− speech-transmitting line; and a connecting unit provided in the body of the telephone connecting the Tx+ speech-transmitting line to a speech-transmitting unit, the Rx+ speech-receiving line to a speech-receiving unit, the Rx− speech-receiving line and the Tx− speech-transmitting line to the ground.

7. The apparatus for reducing echoes and noises according to claim 6, with the handset connector card being a curl cord.

8. An apparatus, comprising:

a round-type handset connector cord including speech-transmitting lines and speech receiving lines arranged into a round configuration and including the speech-transmitting lines and the speech-receiving lines connecting a handset to a body of a telephone with the speech-transmitting lines being connected to a first transducer of a handset and the speech-receiving lines being connected to a second transducer of the handset; and a connecting unit provided in the body of the telephone device and including at least one of the speech-transmitting lines connected to a transmitting unit and at least one of the speech-receiving lines connected to a speech receiving unit.

9. The apparatus of claim 8, further comprising a differential amplifier installed between the speech-transmitting unit and the speech transmitting line terminals.

10. The apparatus of claim 9, the speech-transmitting line of a second type being connected to the second transducer being a microphone and the first transducer being a speaker.

11. The apparatus of claim 9, with the speech-transmitting line of a second type being connected to a non-inversion input terminal of the differential amplifier while the speech-transmitting line of a first type being connected to an inversion input terminal of the differential amplifier.

12. The apparatus of claim 9, the differential amplifier applies signals received through the speech-transmitting lines to the speech-transmitting unit by differentially amplifying the signals.

13. The apparatus of claim 9, the signals induced from the speech-receiving line of the second type to the speech-transmitting lines of the first and second type being cleared by the signals inputted into the differential amplifier with the same phase and magnitude.

14. The apparatus of claim 8, with the speech-receiving line terminal of a first type being connected to the speech-receiving unit, the speech-transmitting line terminal of a first type being connected to the ground, a speech-transmitting line terminal of a second type being connected to a speech-transmitting unit.

15. The apparatus of claim 14, with a speech-receiving line of a second type being grounded.

16. The apparatus of claim 8, with the speech-transmitting lines of a first type and a second type being opposed to each other.

17. The apparatus of claim 16, with each of the speech-receiving lines of a first and second type alternating with each of the speech-transmitting lines of the first and second type in the round configuration.

18. The apparatus of claim 17, the speech-receiving lines and the speech-transmitting lines being arranged in the round configuration with the lines arranged clockwise in the order of the speech-transmitting line of the second type, the speech-receiving line of the first type, the speech-transmitting line of the first type and the speech-receiving line of the second type.

19. The apparatus of claim 18, the round-type handset connector cord including the interval between the speech-receiving line of the second type and the speech-transmitting line of the second type to be the same as the interval between the speech-receiving line of the second type and the speech-transmitting line of the first type accommodating the signals induced by the speech-transmitting lines of the first and second type having the same magnitude.

20. An apparatus, comprising:

a handset connector cord including lines arranged in the order of a speech-receiving line of a first type, a speech-receiving line of a second type, a speech-transmitting line of a first type and a speech-transmitting line of a second type, the speech-transmitting lines and the speech-receiving lines connecting a handset to a body of a telephone with the handset accommodating a user to send and receive voice information; and a connecting unit provided in the body of the telephone device and including at least one of the speech-transmitting lines connected to a transmitting unit and at least one of the speech-receiving lines connected to a speech receiving unit, with the handset connector cord being a flat-type.

21. The apparatus of claim 20, the connecting unit being constituted to correspond to the construction of the flat-type handset connector cord.

22. The apparatus of claim 21, in the connecting unit, a speech-transmitting line terminal of the first type being connected to the speech-transmitting unit, a speech-receiving line terminal of the first type being connected to the speech-receiving unit, and a speech-transmitting line terminal of a second type and a speech-receiving line terminal of a second type being connected to the ground.

23. An apparatus, comprising:

a handset connector cord including lines arranged in the order of a speech-receiving line of a first type, a speech-receiving line of a second type, a speech-transmitting line of a first type and a speech-transmitting line of a second type, the speech-transmitting lines and the speech-receiving lines connecting a handset to a body of a telephone with the handset accommodating a user to send and receive voice information; and a connecting unit provided in the body of the telephone device and including at least one of the speech-transmitting lines connected to a transmitting unit and at least one of the speech-receiving lines connected to a speech receiving unit, with a speech-transmitting line of the first type being connected to the speech-transmitting unit, the speech-receiving line of the first type being connected to the speech-receiving unit, and the speech-transmitting line of the second type and the speech-receiving line of the second type being connected to the ground.

24. The apparatus of claim 23, with the handset including the speech-transmitting line of the first type being placed between the speech-receiving line of the second type and the speech-transmitting line of the second type to prevent a signal from being induced from the speech receiving line of the first type to the speech-transmitting line of the first type.

* * * * *